United States Patent
Charlet

(10) Patent No.: US 7,409,343 B2
(45) Date of Patent: Aug. 5, 2008

(54) VERIFICATION SCORE NORMALIZATION IN A SPEAKER VOICE RECOGNITION DEVICE

(75) Inventor: Delphine Charlet, Lannion (FR)

(73) Assignee: France Telecom, Paris (FR)

( * ) Notice: Subject to any disclaimer, the term of this patent is extended or adjusted under 35 U.S.C. 154(b) by 868 days.

(21) Appl. No.: 10/623,607

(22) Filed: Jul. 22, 2003

(65) Prior Publication Data

US 2004/0107099 A1 Jun. 3, 2004

(30) Foreign Application Priority Data

Jul. 22, 2002 (FR) .................................. 02 09299

(51) Int. Cl.
*G10L 15/00* (2006.01)
*G10L 17/00* (2006.01)
*G10L 19/14* (2006.01)

(52) U.S. Cl. ................. 704/246; 704/231; 704/234; 704/250

(58) Field of Classification Search ............... 704/246, 704/250

See application file for complete search history.

(56) References Cited

U.S. PATENT DOCUMENTS

| 4,032,711 | A | * | 6/1977 | Sambur .................... 704/246 |
| 4,837,830 | A | * | 6/1989 | Wrench et al. ............. 704/238 |
| 5,675,704 | A | * | 10/1997 | Juang et al. ................ 704/246 |
| 5,842,165 | A | * | 11/1998 | Raman et al. .............. 704/255 |
| 5,884,261 | A | * | 3/1999 | de Souza et al. ........... 704/255 |
| 5,895,448 | A | * | 4/1999 | Vysotsky et al. .......... 704/270.1 |
| 5,946,654 | A | * | 8/1999 | Newman et al. ............ 704/246 |
| 6,073,101 | A | * | 6/2000 | Maes ........................ 704/275 |
| 6,094,632 | A | * | 7/2000 | Hattori ....................... 704/239 |
| 6,107,935 | A | * | 8/2000 | Comerford et al. ......... 340/5.52 |
| 6,119,084 | A | * | 9/2000 | Roberts et al. ............. 704/246 |
| 6,125,345 | A | * | 9/2000 | Modi et al. ................. 704/240 |
| 6,219,639 | B1 | * | 4/2001 | Bakis et al. ................ 704/246 |
| 6,246,980 | B1 | * | 6/2001 | Glorion et al. ............. 704/231 |
| 6,327,564 | B1 | * | 12/2001 | Gelin et al. ................. 704/233 |

OTHER PUBLICATIONS

Viikki, O. Bye, D. Laurila, K. 'A recursive feature vector normalization approach for robust speechrecognition in noise'; Proceedings of the 1998 IEEE International Conference on Acoustics, Speech, and Signal Processing, 1998. ICASSP '98. Publication Date: May 12-15, 1998 vol. 2, On pp. 733-736.*

(Continued)

*Primary Examiner*—David R. Hudspeth
*Assistant Examiner*—Justin W Rider
(74) *Attorney, Agent, or Firm*—Lowe Hauptman Ham & Berner LLP

(57) ABSTRACT

During a learning phase, a speech recognition device generates parameters of an acceptance voice model relating to a voice segment spoken by an authorized speaker and a rejection voice model. It uses normalization parameters to normalize a speaker verification score depending on the likelihood ratio of a voice segment to be tested and the acceptance model and rejection model. The speaker obtains access to a service application only if the normalized score is above a threshold. According to the invention, a module updates the normalization parameters as a function of the verification score on each voice segment test only if the normalized score is above a second threshold.

17 Claims, 2 Drawing Sheets

OTHER PUBLICATIONS

Pierrot, J.B. et al, "A Comparison of A Priori Threshold Setting Procedures for Speaker Verification in the Cave Project," Proceedings ICASSP, 1998.

Marithoz, J. et al, "A Map Approach, with Synchronous Decoding and Unit-Based Normalization for Text-Dependent Speaker Verification," Proceedings ICASSP, 2000.

Matsui, T., et al, "Robust Methods of Updating Model and A Priori Threshold in Speaker Verification," Proceedings ICASSP, 1996, p. 97-100.

Hebert, M., et al, "Improved Normalization without Recourse to an Imposter Databse for Speaker Verification," 2000 IEEE International Conference on Acoustics, Speech and Signal Processing Proceedings, Istanbul, Turkey, Jun. 5-9, 2000, vol. 2, pp. 1213-1216, XP001072110.

Rabiner, L., "A Tutorial on Hidden Markov Models and Selected Applications in Speech Recognition," Proceedings on the IEEE, vol. 77, No. 2, Feb. 1989, p. 257-286.

Reynolds, D., "Speaker Identification and Verification Using Gaussian Mixture Speaker Models," Speech Communication 17, 19895, p. 91-108.

* cited by examiner

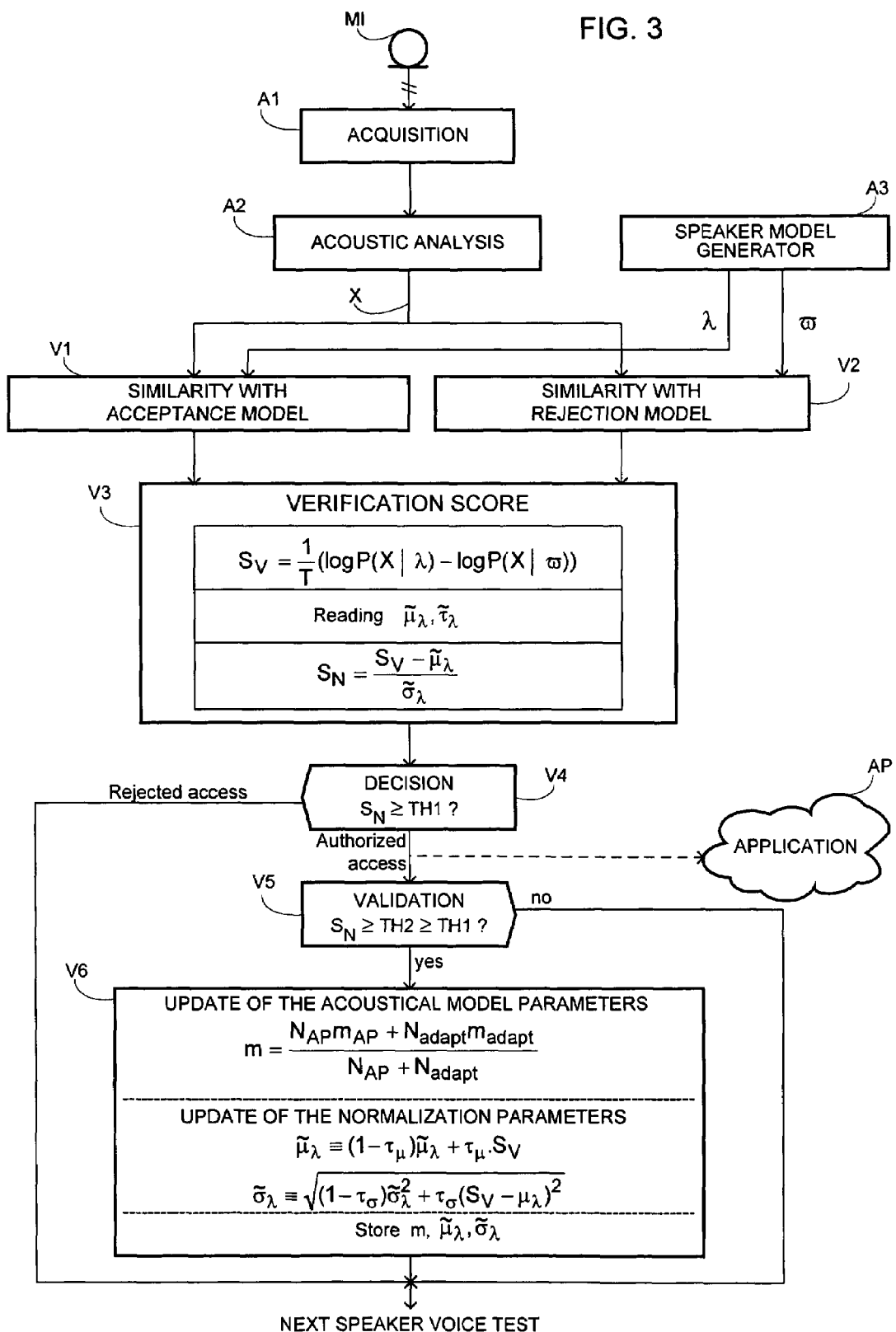

VERIFICATION SCORE NORMALIZATION IN A SPEAKER VOICE RECOGNITION DEVICE

BACKGROUND OF THE INVENTION

1. Field of the Invention

The present invention relates to automatic speaker voice recognition, and more particularly to verification of a speaker authorized to access a service application, whether independently of or depending on the content of the voice segment spoken by the speaker, such as a password.

2. Description of the Prior Art

Speaker verification, or voice authentication, is an ergonomic way of securing access. Unfortunately, its present performance does not assure total security.

A developer of speaker verification means in an automatic voice recognition device, which constitutes the subject matter of the invention, must achieve a compromise between an authorized level of fraud corresponding to impostors accessing the application and the required level of ergonomy, corresponding to a rate of acceptance of legitimate speakers to whom the service application cannot be refused.

The compromise between security and ergonomics conditions the value of a decision threshold. Any speaker verification method yields a verification score that represents the similarity between a presumed authorized speaker voice model and an unknown speaker voice segment seeking access to the application. The verification score is then compared to the decision threshold. Depending on the result of this comparison, the device decides whether to accept or to reject the unknown speaker, in other words whether or not to authorize the speaker to access the application. If the decision threshold is severe and thus high, few impostors will be accepted by mistake, but authorized speakers will be rejected. If the decision threshold is lax and thus weak, few authorized speakers will be rejected but many impostors will be accepted.

The difficulty therefore lies in determining the decision threshold, especially since, for the same rate of acceptance, the threshold varies from one speaker to another ("A COMPARISON OF A PRIORI THRESHOLD SETTING PROCEDURES FOR SPEAKER VERIFICATION IN THE CAVE PROJECT" J.-B. PIERROT et al., Proceedings ICASSP, 1998).

Thus the distribution of the verification scores depends on the speaker voice model used to calculate them. Optimum speaker verification therefore requires a respective decision threshold for each model.

One way to circumvent the speaker sensitivity of the threshold is to normalize the distribution of the verification scores. Applying an appropriate transformation to render the distributions of the scores independent of the speaker model solves the problem of searching for a threshold for each speaker, i.e. for each speaker model. Thus the problem is shifted to that of finding a way of normalizing the scores.

In the "z-norm" method described in the paper "A MAP APPROACH, WITH SYNCHRONOUS DECODING AND UNIT-BASED NORMALIZATION FOR TEXT-DEPENDENT SPEAKER VERIFICATION", Johnny MARIETHOZ et al., Proceedings ICASSP, 2000, the verification score distribution is normalized by means of parameters $\mu_x$ and $\sigma_x$ of the distribution of estimated impostor scores over a population of impostors. If $s_x(Y)$ is the verification score for a voice segment Y to be tested against an authorized speaker model X, the verification score normalized by the z-norm method is:

$$\tilde{s}_x(Y) = \frac{s_x(Y) - \mu_x}{\sigma_x}$$

in which $\mu_x$ and $\sigma_x$ are respectively the mean and the standard deviation of the impostor score distribution for the model X. These normalization parameters are estimated beforehand, during a learning phase, using a database of recordings that are considered to be plausible occurrences of imposture for the speaker model X.

Providing the necessary database of recordings of speakers considered as impostors relative to the authorized speaker is conceivable if the verification of the speaker is a function of a password known to the voice recognition device. This assumes that the developer of the service application will have collected beforehand recordings of persons speaking the password in a context close to the application so that the recordings represent plausible occurrences of imposture tests. This necessary collection of recordings makes it difficult to change the password in a system with a password fixed by the device, and makes it impossible for the authorized speaker using the application to choose a password.

In the more ergonomic situation in which the user chooses the password himself during the learning phase, it is practically impossible to collect recordings of the password by a set of other speakers.

Furthermore, to improve the ergonomics of some applications, during a very short learning phase known as the enrolment phase, a voiceprint of the authorized user speaker is created by generating a voice model for him.

To enrich the model, the authorized speaker voice model is adapted as and when it is used with speech recordings validated by the application or by a decision algorithm, as described in the paper "ROBUST METHODS OF UPDATING MODEL AND A PRIORI THRESHOLD IN SPEAKER VERIFICATION", Tomoko MATSUI et al., Proceedings ICASSP, 1996, p. 97-100. If a user has been recognized, his speech recorded during the access request is used to update his model. This updating enriches the model and takes account of changes in the voice of the authorized speaker over time.

Since the model is enriched, the distribution of the scores is modified and the decision threshold initially defined may become unsuited to the application. This is because the verification scores for an authorized speaker-user improve as more data is used to define the model. If the decision threshold is made relatively lax, so as not to reject too many authorized users in the initial configuration, it is also relatively permissive and allows a large number of impostors to access the application. Because the speaker voice model is enriched as and when access is requested, the distributions of the scores are modified, which can lead to a very low level of rejection of authorized speakers and a relatively high rate of acceptance of impostors, whereas modification of the decision threshold would obtain the full benefit of the enrichment of the model and would preserve a low rate of erroneous rejection combined with a low rate of acceptance of impostors.

In the paper previously cited, MATSUI et al. propose to adapt the decision threshold when the speaker model is adapted. This adaptation is therefore applied directly to the decision threshold for an expected operating point.

The adaptation of the threshold as proposed by MATSUI et al. assumes that the device has retained all of the voice recordings necessary for the learning period and for the adaptation of the speaker model in order to be able to determine a set of verification scores that will be used to estimate a decision threshold for that set. That threshold is interpolated with the old threshold to obtain the new threshold.

This adaptation of the threshold has the following drawbacks. Firstly, occurrences of impostor recording are necessary, which is unrealistic in some applications. Secondly, the speaker speech recordings must be retained in order to re-estimate the decision threshold, which implies a non-negligible cost in terms of memory. Finally, because re-estimation is done at the level of the decision threshold, i.e. for a required operating point, if it is required to modify the operating point for ergonomic reasons, for example, then all the interpolation parameters have to be modified.

OBJECTS OF THE INVENTION

The main object of the invention is to normalize the verification score so that it is compared to a decision threshold that is always pertinent, independently of the speaker, whilst assuring that the verification score evolves with the voice of the authorized speaker without having recourse to additional recordings of impostors. Consequently, in relation to the speech recognition device, another object of the invention is to reduce the memory space necessary for supplementary recordings of impostors whilst guaranteeing a more accurate and fast decision.

SUMMARY OF THE INVENTION

To achieve the above objects, a device for automatically recognizing the voice of a speaker authorized to access an application, comprising means for generating beforehand, during a learning phase, parameters of an acceptance voice model relative to a voice segment spoken by the authorized speaker and parameters of a rejection voice model, means for normalizing by means of normalization parameters a speaker verification score depending on the likelihood ratio between a voice segment to be tested and the acceptance model and rejection model, and means for comparing the normalized verification score to a first threshold in order to authorize access to the application by the speaker who spoke the voice segment to be tested only if the normalized verification score is at least as high as the first threshold. This device is characterized, according to the invention, in that it includes means for updating at least one of the normalization parameters as a function of a preceding value of said parameter and the speaker verification score on each voice segment test only if the normalized verification score is at least equal to a second threshold that is at least equal to the first threshold.

The expression "at least equal to" means a variable greater than or equal to a threshold.

If it is required to modify the operating point, the first threshold is modified without necessitating adjustment of the parameters.

Thus the normalized score is updated on-line, as and when speaker verification attempts and therefore requests to access the application are made, so that the normalized score evolves with changes in the voice of the speaker. Updating as a function of at least one parameter and not a threshold means that the normalized decision score can be modified independently of the operating point required by the application.

The updated normalization parameter can be representative of the statistical mean value of the speaker verification score or of the standard deviation of the speaker verification score, or these two parameters are updated.

The updating of the normalized score is further improved if the device comprises means for updating at least one of the parameters of the acceptance model as a function of a preceding value of said model parameter only if the normalized verification score is at least equal to the second threshold.

BRIEF DESCRIPTION OF THE DRAWINGS

Other objects, features and advantages of the present invention will be apparent from the following detailed description of several embodiments of the invention with reference to the corresponding accompanying drawings in which:

FIG. 3 is a functional block diagram of speaker verification means included in the device.

DESCRIPTION OF THE PREFERRED EMBODIMENTS

Figure 1:
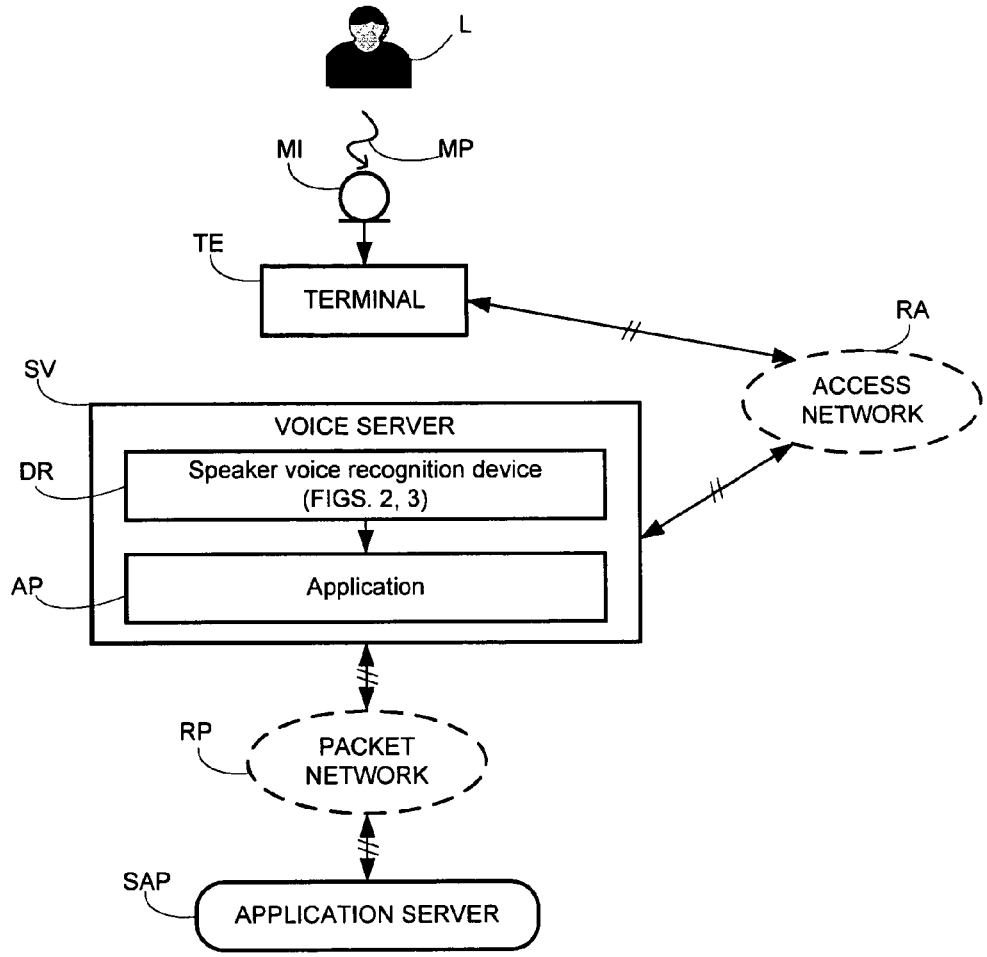
FIG. 1 is a schematic block diagram of a telecommunication system with a server containing a speaker voice recognition device.

FIG. 1 shows diagrammatically a preferred context of use of an automatic speaker voice recognition device DR according to the invention. The context is that of a client-server telecommunication system in which a speaker terminal TE such as a telephone or a personal computer equipped with a modem, or a mobile terminal such as a mobile telephone, is connected to an interactive telephone voice server SV containing the device DR via a telephone or cellular mobile telephone access network RA. If an authorized speaker wishes to access a predetermined service application AP, a password MP or a phrase spoken by an authorized speaker L into the microphone MI of the terminal TE is transmitted to the server SV in response to a prompt to transmit the password during a dialog with the voice server SV. The device DR analyzes the password MP and allows access to the predetermined application AP if the voice of the speaker L is recognized correctly. For example, the application AP offers services managed in an application server SAP connected to the voice server SV via a packet network RP such as the internet network.

In other application variants, the device DR is implemented in a terminal, such as a telephone, a personal computer, a mobile telephone, or a personal digital assistant.

Figure 2:
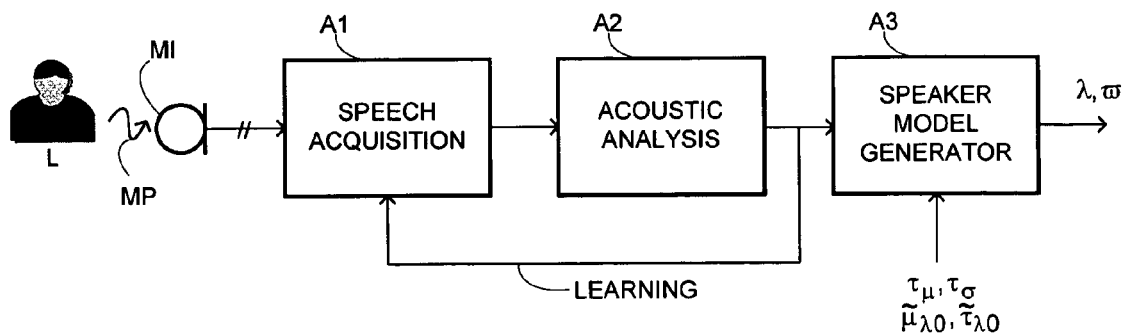
FIG. 2 is a functional block diagram of learning means included in the device.

As shown in FIGS. 2 and 3, the automatic speaker voice recognition device DR according to the invention includes learning means comprising three software modules A1, A2 and A3 and automatic speaker verification means comprising six software modules V1 to V6. They cooperate with a portion of nonvolatile memory in the server to store various parameters used in determining normalized verification scores as explained later and the majority of which are updated.

The learning means determines parameters characterizing primarily a voice model of the authorized speaker L to be recognized. It includes a speech acquisition module A1 connected to an acoustic source, such as the microphone MI, an acoustic analysis module A2 whose output is looped to an iterative voice model input during a learning phase, and a speaker model generator module A3.

The automatic learning phase, also referred to as the enrolment phase, is based for example on the statistical modeling of a password MP using hidden Markov models (HMM). On the subject of statistical methods using hidden Markov models, see the paper by Lawrence R. RABINER, "A Tutorial on Hidden Markov Models and Selected Applications in speech Recognition", Proceedings of the IEEE, vol. 77, No. 2, February 1989, p. 257-286. The password MP is spoken into the microphone MI during N (typically N=3) speech occurrences each of predetermined duration by the speaker L authorized to access the application AP in the voice server SV. N versions of the password are then stored in the acquisition module A1, following analog-to-digital conversion. The password MP is chosen freely by the speaker L and is unknown a priori to the speaker voice recognition device DR. No recording of the password spoken by speakers other than the authorized speaker L is necessary during the learning phase.

As an alternative to the above, there are no restrictions on the composition of the password, i.e. the password can consist of any voice segment and can be changed at will by the authorized speaker for each attempt to recognize his voice.

As and when versions of the spoken password are analyzed, the analysis module A2 estimates, in a known iterative manner, predetermined parameters m of a hidden Markov model $\lambda$, in order to deduce therefrom mean values of the Gaussian distribution of the model parameters. Because of the small quantity of data available resulting from the analysis of the small number N of the versions of password, the module A2 inherits other parameters from a general voice model that have been stored beforehand in the module A2. The parameters of the acceptance voice model $\lambda$ generated in this way for the authorized speaker L are stored in the module A3.

The voice model $\lambda$, also referred to as an acoustical reference, is characteristic of the voice of the authorized speaker L and can be associated in the memory of the server SV with an identifier of the speaker, such as a private code entered via the keypad of the terminal TE before speaking the password MP.

In parallel with the construction of the acceptance model $\lambda$, the acoustic analysis module A2 constructs a rejection voice model $\bar{\omega}$, also referred to as an alternative model (background model) or anti-model. The parameters of the rejection model $\bar{\omega}$ are known and prestored in the server SV during the learning phase. They are representative of a "mean" voice model of a large number of random speakers, and consequently of an impostor voice model.

At the end of the learning phase, the generation module A3 determines initial parameter values $\mu_{\lambda,0}$ and $\sigma_{\lambda,0}$ necessary for normalizing the verification score in accordance with the invention, as estimated from a corpus of learning data defined beforehand, in particular as a function of the application AP that the speaker accesses using the recognized password. The learning data was written previously into the memory of the server SV and enables the module A3 to determine initial normalization parameter values $\mu_{\lambda,0}$ and $\sigma_{\lambda,0}$ depending in particular on parameters of the voice models $\lambda$ and $\bar{\omega}$ and used in recurrent formulas of these parameters during a first test, and adaptation factors $\tau_\mu$ and $\tau_\sigma$ for the normalization parameters $\mu_\lambda$ and $\sigma_\lambda$, respectively.

As an alternative to the above, instead of generating HMM parametric models, the acceptance and rejection models $\bar{\omega}$ are generated using Gaussian mixture models (GMM) based on the mixing of normal distributions, referred to as Gaussian distributions, relative to parameters. Gaussian mixture models are defined in the paper by Douglas A. REYNOLDS, "Speaker identification and verification using Gaussian mixture speaker models", Speech Communication 17, 1995, p. 91-108, for example.

At the time of an attempt to access the application AP, for example after validation by the voice server SV of the private code previously cited, the speaker L speaks into the microphone MI a voice segment containing the password MP, i.e. a speech signal occurrence X during a time period T, in order for the string of modules V1 to V6 shown in FIG. 3 to verify that the speaker is indeed the speaker who spoke the password during the learning phase. The time period T is expressed as a number of portions of the voice segment, referred to as frames, having a predetermined duration of 32 ms. The number T varies as a function of how fast the speaker speaks.

The acquisition modules A1 and A2 acoustically analyze the signal X containing the password MP that has just been spoken and produce a test voice signal X comprising a series of T cepstral coefficient vectors.

Similarity modules V1 and V2 evaluate the similarities between the test voice signal X produced by the acoustic analysis module A2, on the one hand, and the acceptance voice model $\lambda$ and the rejection voice model $\bar{\omega}$ read in memory by the module A3, on the other hand, the parameters m of the models $\lambda$ and $\bar{\omega}$ having been updated at the end of the preceding speaker voice verification, as explained below. The similarities are expressed as conditional probabilities $P(X|\lambda)$ and $P(X|\bar{\omega})$ respectively produced by the modules V1 and V2, and characterizing the likelihood that the observed test voice signal X is representative of the authorized speaker that spoke a voice segment represented by the acceptance model $\lambda$ and the likelihood that the observed test voice signal X is representative of any speaker who may have spoken a voice segment represented by the rejection model $\bar{\omega}$.

The module V3 determines the verification score $S_V$ as a function of the probabilities produced, in accordance with the following equation:

$$S_V = \frac{1}{T}(\log P(X/\lambda) - \log P(X/\bar{\omega})).$$

The score is proportional to the ratio of the likelihoods relating to the acceptance model $\lambda$ representative of the authorized speaker and the rejection model $\bar{\omega}$ representative of any speaker. It expresses the confidence accorded to the observed test voice signal X. The higher the score $S_V$, the closer the characteristics of the voice of the speaker producing the test voice signal X are to those of the acceptance model $\lambda$. T denotes the number of frames contained in the voice segment MP to be tested.

The module V3 also determines a normalized verification score $S_N$ as a function of the speaker verification score $S_V$ and two updated normalization parameters $\mu_\lambda$ and $\sigma_\lambda$ of the acceptance model $\lambda$ representative of the voice of the authorized speaker L, in accordance with the following equation:

$$S_N = \frac{S_V - \tilde{\mu}_\lambda}{\tilde{\sigma}_\lambda}.$$

The two parameters $\mu_\lambda$ and $\sigma_\lambda$ result from updating at the end of the speaker verification that preceded the current verification and in accordance with the following recurrence relationships:

$$\mu_\lambda \equiv (1-\tau_\mu)\mu_\lambda + \tau_\mu \cdot S_V$$

$$\sigma_\lambda \equiv \sqrt{(1-\tau_\sigma)\sigma_\lambda^2 + \tau_\sigma(S_V - \mu_\lambda)^2}.$$

The first normalization parameter $\mu_\lambda$ represents the statistical mean value, i.e. the mathematical esperance of the speaker verification score. The updating of the first parameter is weighted by a predetermined adaptation factor $\tau\mu$ less than 1. The second normalization parameter $\sigma_\lambda$ represents the standard deviation of the verification score $S_V$, which is equal to the square root of the difference of the mean squared value of the score $S_V$ and the square of the statistical mean value $\mu_\lambda^2$. The updating of the second parameter is weighted by another predetermined adaptation factor $\tau_\sigma$ less than 1. Thus the normalization parameters $\mu_\lambda$ and $\sigma_\lambda$ are updated on-line by estimating their mean values over preceding speaker verifications.

The values of the parameters $\mu_\lambda$ and $\sigma_\lambda$ in the right-hand members of the above two recurrence relationships were determined during the speaker verification preceding the current verification and are read with the adaptation factors $\tau_\mu$ and $\tau_\sigma$ by the module V3 before the determination of the score $S_N$. During the first speaker verification after the learning phase, the initial parameters $\mu_{\lambda,0}$ and $\sigma_{\lambda,0}$ are read by the module V3 as parameters $\mu_\lambda$ and $\sigma_\lambda$ used for the first determination of the normalized score $S_N$.

The normalization of the speaker verification score $S_V$ to yield the normalized score $S_N$ advantageously tracks variations in the verification score, i.e. in the voice of the speaker, represented by the parameters $\mu_\lambda$ and $\sigma_\lambda$. As explained hereinafter, evolution of the voice of the authorized speaker L is reflected in the normalized score $S_N$ by updating the parameters $\mu_\lambda$ and $\sigma_\lambda$, and also model parameters m used for the initial modeling.

The decision module V4 then compares the normalized score $S_N$ to a first determined threshold TH1. The module V4 authorizes the speaker to access the service application AP if the normalized score $S_N$ is equal to or greater than the predetermined threshold TH1.

On the other hand, if $S_N$<TH1, the speaker is refused access to the service application AP. There is no updating of parameters since the speaker is regarded as an impostor. The voice server SV preferably prompts the speaker to speak the password MP a few more times, for example three times.

The access decision taken in the module V4 depends on the threshold TH1, which is constant and therefore independent of the authorized speaker. According to the invention, the decision depends more on the normalized verification score $S_N$ whose parameters, such as the factors $\tau_\mu$ and $\tau_\sigma$, are chosen once and for all, depending on the required ergonomics for access to the application AP. If the application type is changed, the threshold TH1 and a second threshold TH2 can be modified by the manager of the new application in the server SV.

If access is authorized, the validation module V5 compares the normalized threshold $S_N$ to the second threshold TH2, which is preferably higher than the first threshold TH1, although the two thresholds can be equal. The adaptation module V6 updates parameters only if the normalized score is higher than the threshold TH2, i.e. if the voice of the authorized speaker has changed significantly, for example, in particular because of ageing or because the speaker is suffering from laryngitis.

As already stated, the normalization parameters $\mu_\lambda$ and $\sigma_\lambda$ are updated in accordance with the above two recurrence relationships as a function of the verification score $S_V$ that has just been determined by the module V3 and the parameters $\mu_\lambda$ and $\sigma_\lambda$ that were determined during the preceding speaker verification.

One or both adaptation factors $\tau_\lambda$ and $\tau_\sigma$ preferably vary as a function of the number of adaptations, i.e. the number of normalization parameter updates effected in the module V6 since the learning phase, in order to adapt the normalization parameters quickly so that they can converge rapidly during the first adaptations, and then less and less so, until adaptation is suspended. The higher the adaptation speed factor $\tau_\mu$, $\tau_\sigma$, the faster the adaptation of the parameter $\mu_\lambda$, $\sigma_\lambda$.

The module V6 also updates each parameter m at least of the acceptance model $\lambda$ and possibly of the rejection model $\overline{\omega}$, so as to reduce the imposture rate represented by the probability $P(X|\overline{\omega})$. The updating of each model parameter m is based on an adaptation that can be incremented in accordance with the following recurrence relationship:

$$m = \frac{N_{AP} m_{AP} + N_{adapt} m_{adapt}}{N_{AP} + N_{adapt}}.$$

$m_{AP}$ and $N_{AP}$ respectively denote the mean value of the Gaussian distribution, also called normal distribution, of the probability density of the model parameter m during the learning phase and the number of frames in the voice segments, i.e. in the passwords, used to estimate mean values of Gaussian distributions relative to the hidden Markov models $\lambda$ et $\overline{\omega}$. The $m_{adapt}$ parameter denotes the mean value of the Gaussian distribution of the probability density of the model parameter m which has been determined during the update that has just been effected and thus which reflects the evolution of the parameter m during updates, after the learning phase. $N_{adapt}$ denotes the number of frames used to estimate the mean value of the Gaussian distribution of the model parameter m for the updates just effected. The number T of voice signal frames to be tested varies from one verification to the next, in particular as a function of how fast the speaker speaks.

After the update, the module V6 stores the new values of the parameters m of the voice models $\lambda$ and $\overline{\omega}$ and of the normalization parameters $\mu_\lambda$ and $\sigma_\lambda$ that will be used to determine scores $S_V$ and $S_N$ in the module V3 during the next speaker voice test.

Instead of the above, and in particular to reduce the duration of each speaker verification, only one of the normalization parameters $\mu_\lambda$ and $\sigma_\lambda$ is updated, preferably only the statistical mean value parameter $\mu_\lambda$, which is achieved by assigning the value zero to the adaptation factor $\tau_\sigma$. Similarly, only one or a few model parameters m are updated, which is achieved by assigning the value zero to the frame number $N_{adapt}$ for the other model parameters that are not to be updated.

What I claim is:

1. A device for automatically recognizing the voice of a speaker authorized to access an application, said device comprising means for generating beforehand, during a learning phase, parameters of an acceptance voice model relative to a voice segment spoken by said authorized speaker and parameters of a rejection voice model, means for normalizing by means of normalization parameters a speaker verification score depending on the likelihood ratio between a voice segment to be tested and said acceptance model and rejection model for thereby deriving a normalized verification score, and means for comparing said normalized verification score to a first threshold in order to authorize access to the application by the speaker who spoke said voice segment to be tested only if the normalized verification score is at least as high as the first threshold, and means for updating at least one of said normalization parameters as a function of a preceding value of said one normalization parameter and the speaker verification score on each voice segment test only if the normalized verification score is at least equal to a second threshold that exceeds said first threshold.

2. A device according to claim 1, wherein said one of said updated normalization parameters is representative of a statistical mean value of the speaker verification score.

3. A device according to claim 2, wherein said statistical mean value $\tilde{\mu}_\lambda$ of the speaker verification score $S_V$ is updated in accordance with the following relationship:

$$\tilde{\mu}_\lambda \equiv (1-\tau_\mu)\tilde{\mu}_\lambda + \tau_\mu \cdot S_V$$

in which $\tau_\mu$ is a predetermined adaptation factor.

4. A device according to claim 3, wherein said predetermined adaptation factor $\tau_\mu$ varies as a function of the number of normalization parameter updates.

5. A device according to claim 1, wherein said one of said updated normalization parameters is representative of a measure of spread of values of said speaker verification score.

6. A device according to claim 5, wherein said measure of spread of values is standard deviation $\tilde{\sigma}_\lambda$ of the speaker verification score $S_V$ and the means for updating is arranged for updating the standard deviation in accordance with the following relationship:

$$\tilde{\sigma}_\lambda \equiv \sqrt{(1-\tau_\sigma)\tilde{\sigma}_\lambda^2 + \tau_\sigma(S_V-\tilde{\mu}_\lambda)^2}$$

in which $\tau_\sigma$ is a predetermined adaptation factor.

7. A device according to claim 6, wherein said predetermined adaptation factor $\tau_\sigma$ varies as a function of the number of normalization parameter updates.

8. A device according to claim 1, comprising means for updating at least one of said parameters of said acceptance voice model as a function of a preceding value of said model parameter only if the normalized verification score is at least equal to said second threshold.

9. A device according to claim 8, wherein said model parameter m is updated in accordance with the following equation:

$$m = \frac{N_{AP} m_{AP} + N_{adapt} m_{adapt}}{N_{AP} + N_{adapt}}$$

in which $m_{AP}$ and $N_{AP}$ respectively denote a mean value of Gaussian distribution of probability density of said model parameter m during said learning phase and the number of frames in voice segments used to estimate mean values of Gaussian distributions relative to said acceptance model and rejection model, $m_{adapt}$ denotes a mean value of Gaussian distribution of probability density of said model parameter m determined during the update that has just been effected, and $N_{adapt}$ denotes the number of frames used to estimate a mean value of the Gaussian distribution of said model parameter m for said update that has just been effected.

10. A device according to claim 1, wherein said normalized verification score $S_N$ is determined as a function of said speaker verification score $S_V$ and two updated normalization parameters $\tilde{\mu}_\lambda$ and $\tilde{\sigma}_\lambda$, in accordance with the following equation:

$$S_N = \frac{S_V - \tilde{\mu}_\lambda}{\tilde{\sigma}_\lambda},$$

in which said parameters $\tilde{\mu}_\lambda$ and $\tilde{\sigma}_\lambda$ are respectively the statistical mean value and the standard deviation of said speaker verification score.

11. Apparatus for automatically recognizing the voice of a speaker authorized to access an application, said apparatus comprising a processor arrangement for: (a) storing parameters of an acceptance voice model and parameters of a rejection voice model, the parameters of the acceptance and rejection voice models being stored in the processor arrangement before the processor arrangement automatically recognizes the voice, the parameters of the acceptance voice model being relative to a voice segment spoken by said authorized speaker, (b) normalizing, with the aid of normalization parameters, a speaker verification score depending on the likelihood ratio between a voice segment to be tested and said acceptance model and rejection model for thereby deriving a normalized verification score, (c) comparing said normalized verification score to a first threshold, (d) authorizing access to the application by the speaker who spoke said voice segment to be tested only if (c) indicates the normalized verification score is at least as high as the first threshold, and (e) updating at least one of said normalization parameters as a function of a preceding value of said one normalization parameter and the speaker verification score on each voice segment test only if the normalized verification score is at least equal to a second threshold that exceeds said first threshold.

12. The apparatus of claim 11, wherein said one of said updated normalization parameters is representative of a statistical mean value of the speaker verification score.

13. The apparatus of claim 11, wherein said one of said updated parameters is representative of a measure of spread of values of said speaker verification score.

14. The apparatus of claim 11, wherein the processor arrangement is arranged for updating at least one of said parameters of said acceptance voice model as a function of a preceding value of said model parameter only if the normalized verification score is at least equal to said second threshold.

15. The apparatus of claim 14, wherein said model parameter m is updated in accordance with the following equation:

$$m = \frac{N_{AP} m_{AP} + N_{adapt} m_{adapt}}{N_{AP} + N_{adapt}}$$

in which $m_{AP}$ and $N_{AP}$ respectively denote a mean value of Gaussian distribution of probability density of said model parameter m during said learning phase and the number of frames in voice segments used to estimate mean values of Gaussian distributions relative to said acceptance model and rejection model, $m_{adapt}$ denotes a mean value of Gaussian distribution of probability density of said model parameter m determined during the update that has just been effected, and $N_{adapt}$ denotes the number of frames used to estimate a mean value of the Gaussian distribution of said model parameter m for said update that has just been effected.

16. A method of recognizing the voice of a speaker authorized to access an application, said method comprising: generating beforehand, during a learning phase, parameters of an acceptance voice model relative to a voice segment spoken by said authorized speaker and parameters of a rejection voice model; normalizing, with the aid of normalization parameters, a speaker verification score depending on the likelihood ratio between a voice segment to be tested and said acceptance model and rejection model to thereby derive a normalized verification score; comparing said normalized verification score to a first threshold; authorizing access to the application by the speaker who spoke said voice segment to be tested only if the comparing step indicates normalized verification score is at least as high as the first threshold; and updating at least one of said normalization parameters as a function of a preceding value of said one normalization parameter and the speaker verification score on each voice segment test only if the normalized verification score is at least equal to a second threshold that exceeds said first threshold.

17. The method of claim 16 further comprising updating at least one of said parameters of said acceptance voice model as a function of a preceding value of said model parameter only if the normalized verification score is at least equal to said second threshold.

* * * * *